(12) United States Patent
Blong et al.

(10) Patent No.: US 7,148,301 B2
(45) Date of Patent: Dec. 12, 2006

(54) HIGH PURITY FLUOROPOLYMERS

(75) Inventors: Thomas J. Blong, Woodbury, MN (US); Denis Duchesne, Woodbury, MN (US); Gernot Loehr, Burgkirchen (DE); Albert Killich, Burgkirchen (DE); Tilman Zipplies, Burghausen (DE); Ralph Kaulbach, Emmerting (DE); Herbert Strasser, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 300 days.

(21) Appl. No.: 10/743,208

(22) Filed: Dec. 22, 2003

(65) Prior Publication Data

US 2004/0132927 A1 Jul. 8, 2004

Related U.S. Application Data

(62) Division of application No. 09/864,649, filed on May 23, 2001, now Pat. No. 6,693,164.

(60) Provisional application No. 60/208,626, filed on Jun. 1, 2000.

(51) Int. Cl.
*C08F 116/12* (2006.01)

(52) U.S. Cl. .............. 526/247; 526/242; 526/250; 526/253; 526/254; 526/255; 528/480; 528/486; 528/487; 528/490

(58) Field of Classification Search .......... 528/480, 528/486, 487, 490; 526/242, 247, 250, 253, 526/254, 255
See application file for complete search history.

(56) References Cited

U.S. PATENT DOCUMENTS

| | | |
|---|---|---|
| 2,751,375 A | 6/1956 | Mantell et al. |
| 2,751,376 A | 6/1956 | Barnhart et al. |
| 2,946,743 A | 7/1960 | Moy et al. |
| 3,085,083 A | 4/1963 | Schreyer |
| 3,528,954 A | 9/1970 | Carlson |
| 3,635,926 A | 1/1972 | Gresham et al. |
| 3,642,742 A | 2/1972 | Carlson |
| 3,735,003 A | 5/1973 | Zimmer et al. |
| 4,262,101 A | 4/1981 | Hartwimmer et al. |
| 4,439,385 A | 3/1984 | Kuhls et al. |
| 4,552,925 A | 11/1985 | Nakagawa et al. |
| 4,743,658 A | 5/1988 | Imbalzano et al. |
| 5,266,639 A | 11/1993 | Chapman, Jr. et al. |
| 5,463,021 A | 10/1995 | Beyer et al. |
| H1736 H | 6/1998 | Legare et al. |
| 5,861,464 A | 1/1999 | Goldmann et al. |
| 2003/0116571 A1 | 6/2003 | Sulzbach et al. |

FOREIGN PATENT DOCUMENTS

| | | |
|---|---|---|
| EP | 0 222 945 A1 | 5/1987 |
| EP | 0 457 255 A2 | 11/1991 |
| EP | 0 226 668 B1 | 1/1992 |
| EP | 0 652 283 A1 | 5/1995 |
| GB | 1 210 794 | 10/1970 |
| WO | WO 94/05712 | 3/1994 |

OTHER PUBLICATIONS

*Modern Fluoropolymers*, John Wiley & Sons, 1997, p. 223-237, "Melt Processable Tetrafluoroethylene-Perfluoropropylvinyl Ether Copolymers (PFA)".
Kirk-Othmer, *Encyclopedia of Chemical Technology*, John Wiley & Sons, Fourth Edition, V. 11, 1994, p. 644, "Perfluorinated Ethylene-Propylene Copolymers".

*Primary Examiner*—Bernard Lipman
(74) *Attorney, Agent, or Firm*—Brian E. Szymanski

(57) ABSTRACT

The invention relates to high purity fluoropolymers and processes for making such materials. These polymers are particularly suited for applications in the semiconductor industry. The process comprises removal of unstable polymer end groups by fluorination and removal of heavy metal impurities by extraction with an aqueous acid medium.

7 Claims, No Drawings

HIGH PURITY FLUOROPOLYMERS

This Application is a divisional of U.S. Ser. No. 09/864,649, filed May 23, 2001, now U.S. Pat. No. 6,693,164, the disclosure of which is herein incorporated by reference, which claims priority to U.S. Provisional Patent Application No. 60/208,626, filed Jun. 1, 2000.

FIELD OF THE INVENTION

The present invention relates to novel high purity fluoropolymers and methods for their production.

BACKGROUND OF THE INVENTION

Fluoropolymers are widely used in industrial applications because of their unique combination of chemical stability and high temperature properties. Certain applications, such as in the semi-conductor industry, demand the highest levels of stability and purity.

The process of polymerizing fluoropolymers results in end groups on the polymer chain ends which are determined by the type of polymerization initiator. Some of these end groups are reactive under certain conditions. Thus, they are a source of instability, albeit at a low level. Reduction of these end groups through fluorination is known and discussed in U.S. Pat. No. 4,743,658, EP 457 255, GB 1,210,794 and DE 1,901,872.

Extractable ions are contained in fluoropolymers as a result of current practices for the production of these materials. The level of these impurities may be increased as a result of the corrosion potential of the unstable end groups discussed above. When these unstable end groups come in contact with metal articles, such as process equipment or containers, impurities can result.

A need still exists for fluoropolymers with none of or very low levels of these impurities and for improved methods for their reduction and/or removal.

SUMMARY OF THE INVENTION

The present invention provides novel fluoropolymers comprising low levels of extractable ions and improved methods of producing such materials.

In one aspect, the present invention relates to a method for the production of a high purity fluoropolymer comprising the steps of:
 a) providing a fluoropolymer having extractable ions, and
 b) contacting the fluoropolymer with an aqueous acid medium for a time sufficient to remove the extractable ions from the fluoropolymer.

In a further aspect, the invention relates to a method for the production of a high-purity fluoropolymer wherein the fluoropolymer has been contacted with the aqueous acid medium for a time sufficient to reduce the level of the extractable ions in the fluoropolymer to less than 0.05 parts per million (ppm) extractable ion, preferably less than 0.02 ppm. These extractable ions are predominantly iron.

This invention is preferably used when the fluoropolymer is a thermoplastic and more preferably used when the fluoropolymer is perfluorinated, i.e. a fluoropolymer derived from perfluorinated monomers.

The present invention also pertains to a method comprising the further step of removing unstable end groups from perfluorinated polymers, particularly when such perfluoropolymers are thermoplastic. Fluorination of the fluoropolymer is a useful method of removing unstable end groups. A useful method of fluorination comprises contacting the fluoropolymer with a fluorine-containing gas. A preferred method of fluorination occurs in an essentially stationary bed. The fluorination process is preferably carried out at a temperature range of between 50° C. and the onset of melting.

By use of such methods, the number of unstable end groups in the fluoropolymer may be reduced to less than 30 per $10^6$ carbon atoms. Preferably, the methods are used to reduce the number of unstable end groups to less than 5 per $10^6$ carbon atoms and more preferably to reduce the unstable end groups to less than 1 per $10^6$ carbon atoms and still more preferably to reduce the unstable end groups to zero per $10^6$ carbon atoms.

The present invention further relates to a fluoropolymer comprising less than 0.05 ppm extractable metal ions, preferably less than 0.02 ppm. More preferably, the fluoropolymer also comprises less than 30 unstable end groups per $10^6$ carbon atoms. Such fluoropolymers are particularly useful in the semi-conductor industry.

The invention also relates, in a preferred combination, to a method for the production of a high purity perfluorinated thermoplastic polymer essentially free from extractable ions comprising the steps of:
 a) providing a perfluorinated thermoplastic polymer in agglomerate form,
 b) drying the agglomerate to remove residual moisture,
 c) fluorinating the dried agglomerate in an essentially stationary bed at a temperature between 50° C. and the onset of melting of the agglomerate,
 d) removing the fluorination media from the agglomerate,
 e) pelletizing the fluorinated agglomerate, and
 f) removing any extractable ions by contacting the pelletized agglomerate with an aqueous acid medium.

DESCRIPTION OF THE INVENTION

The invention pertains to a method for the production of high-purity fluoropolymers, whereby the agglomerate is first fluorinated preferably in an essentially stationary bed. The fluorinated agglomerate is then melt pelletized. The pellets are then subjected to an extraction process by which extractable ions are removed in an aqueous acid medium. The high-purity products obtained in this way are well-suited for purposes demanding high purity, in particular for the semi-conductor industry.

In the following, preferred versions of the invention are explained in more detail.

Typical perfluorothermoplastics are semi-crystalline copolymers made up primarily of units of tetrafluoroethylene (TFE) and of perfluoroalkylvinyl ethers such as perfluoro-(n-propylvinyl)ether (PPVE) or perfluorinated olefins such as hexafluoropropylene (HFP). Copolymers made of TFE and PPVE are commercially available under the designation "PFA", and copolymers of TFE with HFP are available as "FEP". PFA is extensively described in *Modern Fluoropolymers*, John Wiley & Sons, 1997, p. 223 ff., and FEP in Kirk-Othmer, *Encyclopedia of Chemical Technology*, John Wiley & Sons, Fourth Edition, Volume 11 (1994), p. 644. In conjunction with this, copolymers such as PFA and FEP can contain additional perfluorinated comonomers. In this regard, perfluorinated thermoplastics is understood to mean that the resin contains no hydrogen except in the end groups.

As a result of the current practice of production and processing of the resins, metal impurities are unavoidable. This invention describes a method for minimizing and removing these impurities. Because the concentration of iron impurities is generally higher than that of other heavy metals by as much as a factor of 10 or more, iron is considered to be the primary impurity and will be the impurity used to track performance. The product of the invention will exhibit a low level of extractable ions, preferably less than 0.05 ppm of extractable ions and of that, less than 0.02 ppm iron. In accordance with the invention, the extraction is carried out in an aqueous acid medium, advantageously using a volatile acid such as formic acid, hydrofluoric acid, hydrochloric acid or, preferably, nitric acid. The acid used should be of a high purity, such as an analytical grade. The use of hydrochloric acid may lead to corrosion, however. The pH value of the extraction solution is preferably below 6. Thus, if the melt pellets still contain hydrofluoric acid from the production of the polymer, it might not be necessary to add additional acid to the extraction solution.

It is known that the purity of fluorinated plastics can be analytically determined by means of extraction, e.g., through the use of aqueous nitric acid. This is not known as a method of producing fluoropolymers, but only a means of finding and quantifying the impurities, after which the extracted sample is discarded. One aspect of the invention therefore pertains to a method for removing extractable ions by contacting the fluoropolymer with an acidic aqueous extraction solution.

The purification of fluoropolymers, fluorothermoplastics, for example, in the form of a granulate or a formed object by means of extraction using aqueous solutions which contain an inorganic peroxide such as hydrogen peroxide and a complexing agent without acid groups such as triethanolamine, is known from EP A-652 283. In addition, the treatment of fluoropolymer melt pellets with aqueous ammonia for the suppression of corrosion of the metal vessels being used is described in U.S. Pat. No. 5,861,464. In conjunction with this, the pH value of the treatment solution is over 7. Under these conditions, heavy metal salts form insoluble hydroxide deposits, which makes the removal of such metal ions substantially more difficult. Many washing steps would be required in order to achieve the degree of purity mentioned above.

The level of impurities in the fluoropolymers from heavy metal ions such as iron, nickel or chrome are increased by the high corrosion potential of unstable end groups normally present in such polymers. When these end groups come in contact with metal articles, such as process equipment or containers, impurities can result.

From the production standpoint, both PFA and FEP have thermally unstable end groups. This is true, independently of whether the radical polymerization was carried out in an aqueous or non-aqueous system. These thermally unstable end groups, including —COOH, —COF and —CONH$_2$, can be easily detected by infrared (IR) analysis. The unstable end groups can have a negative effect on the processing of such materials, such as the formation of bubbles and discolorations in the end article. The finished articles or end products normally contain unacceptably high concentrations of the heavy metal ions such as iron, nickel or chrome. These high levels of impurities are undesirable, particularly in applications requiring high purity or cleanliness. Resins or finished articles with impurities such as these do not meet the requirements of the semiconductor industry, where the demands on the purity of the plastics are constantly increasing.

In accordance with the invention, what is sought are fluoropolymers, preferably thermoplastics, which are essentially free of unstable end groups which can be detected with IR. In the context of this invention, essentially free means that the sum of these end groups is less than 30 per $10^6$ carbon atoms, preferably less than 5, more preferably less than 1 and still more preferably essentially zero.

As has been mentioned, the removal of unstable groups by means of fluorination is known in the art. With the known methods, the melt pellets are exposed to fluorine treatment. Stainless steel vessels are normally used, in which the resin is exposed to the fluorine gas while being agitated, usually by means of tumbling. Impurities caused by metal fluoride, a result of the fluorine contacting the metal surfaces, are unavoidable when this type of process is used.

In contrast, in this invention, the fluorination step is preferably accomplished in the agglomerate form of the fluoropolymer. The fluoropolymer is preferably dry during fluorination. Preferably, this step occurs in an essentially stationary bed. An essentially stationary bed means, for the purpose of this application, that both the container for holding the agglomerate and the agglomerate itself are not subject to significant movement during the fluorination process. The agglomerate is loaded into the container, the fluorine-containing media is added to the container and a period of contact occurs. The fluorine-containing media, such as a fluorine-containing gas, may be replenished to allow multiple cycles of contact using fresh fluorine-containing media. This is in contrast to prior methods of fluorination where the container is designed to agitate or tumble the polymer for example, by rotating the container. Also, prior methods are thought to have treated the fluoropolymer in the pelletized form.

At this stage, the agglomerate form contains substantially less heavy metal salt contamination than is the case with the melt pellet form. The fluorination also proceeds faster in the agglomerate form as compared to the melt pellet form. The probable reasons for this are that agglomerate form is softer or less dense than a melt pellet form and probably for that reason alone causes less abrasion. Also, the fluorination is a diffusion-controlled process and is completed more quickly when treating a less dense material.

The production of suitable agglomerates is also known, and is described in, for example, U.S. Pat. No. 4,262,101, U.S. Pat. No. 4,743,658 and U.S. Pat. No. 4,439,385, as well as in EP B-0 591 888. The agglomerates that are formed have to be dried carefully because of their friable nature. This is normally accomplished by heating to temperatures just below the onset of melting or softening. In the case of PFA, the temperatures can go as high as approximately 270° C. and up to approximately 180° C. for commercially available FEP resins.

The drying temperatures are not very critical as long as substantially all of the liquid is removed. This of course depends on the nature and quantity of the moisture. In practice, low-boiling organic solvents can thus be eliminated at temperatures as low as 50° C.; aqueous media require temperatures above 100° C. in practice. Residual moisture not only impairs the elimination of the unstable end groups, it also may promote corrosion.

After the agglomerates are dried to a suitable moisture content, they are fluorinated by contacting the agglomerates directly with a fluorine-containing media, such as a fluorine-containing gas. Suitable heat and pressure conditions are desired to complete the reaction in a reasonable time.

In a preferred version of the invention, the hot, dried agglomerate is sent directly to the fluorination reactor, suitably by means of gravitation or pneumatics. Further heating of the agglomerate is not necessary in this case, however a heating of the reactor walls can be advantageous.

As a result of the direct fluorination of the still-hot agglomerate, the heating of the product directly is avoided. This product can be difficult to heat, largely due to poor thermal conductivity. Uniform heating with a hot gas may also be difficult, since the agglomerate contains fine portions which can cake.

The efficiency of the removal of the thermally unstable end groups by means of fluorination is dependent on the selected temperature, the pressure and the time of exposure. Naturally, the pressure is in keeping with the available facility, and can, for example, amount to 10 bar in a suitably configured reactor. Atmospheric pressure is often chosen for safety reasons to minimize an escape of the fluorine off-gases.

The fluorine is usually diluted with an inert gas such as nitrogen. Fluorine concentrations of 10 to 25 vol.-% are common. The fluorination reaction is exothermic. The reaction heat which results from this, when done in the agglomerate form, is generally adequate for maintaining a sufficiently high temperature, which is preferably greater than 50° C.

Depending on the chosen reaction conditions and the available reactor, one-time treatment of the agglomerate with the gas containing the fluorine may not be sufficient. What is expedient, then, may be multiple cycles of an alternating treatment with a fluorine-inert gas mixture and evacuation, whereby it is expedient if evacuation represents the final step. The quantity and concentration of the fluorine used and the number of end groups present in the polymer will also affect the final number of endgroups remaining after treatment. For that reason, if a low-molecular weight resin is being used, then correspondingly more fluorination steps or correspondingly adapted fluorination conditions are needed. For example, if five fluorination cycles are needed for a PFA with a melt-flow index 2, eight fluorination cycles may be necessary for a PFA with a melt-flow index of 20 under otherwise equal conditions. Materials with higher melt flow indexes (i.e., lower molecular weight) will inherently have more end-groups per unit weight.

As was mentioned earlier, the fluorination of the agglomerate is a relatively rapid process. Thus, approximately 30 minutes may be sufficient at about 100° C., and approximately 20 minutes at about 220° C. By contrast, fluorination in the melt pellet form requires the fluorine to diffuse into the pellet in order to be able to make contact with and react with the end groups. In contrast, the agglomerate form is less dense and permits the reaction with the fluorine at a faster rate.

For safety reasons and in order to avoid corrosion, the fluorine remaining after the reaction is complete should be removed. This may be done by means of evacuation and/or flushing with inert gas.

After the unstable end-groups are substantially removed in the fluorination step, the treated agglomerates are normally melt-pelletized. Extrusion equipment with corrosion resistant alloys are generally used. A preferred method to accomplish this step is to transfer the fluorinated agglomerate into the extruder while still hot. Since the unstable end groups have been removed to the greatest possible extent by the fluorination, there is only minimal decomposition during the extrusion process, so that the formation of toxic gases and corrosion are suppressed as well. As a result, the service life of the extrusion and pelletizing equipment is significantly increased.

The pellets made from the treated agglomerates are then subjected to an aqueous extraction and, optionally, a subsequent washing operation in order to remove extractable ions to the greatest possible extent. An acidic pH aqueous wash solution is desired, preferably with a pH less than 6. Depending on the strength of the acid used, its concentration can be very low, 0.01 wt. % for example, and preferably no more than 3 wt. %. The ion extraction step is diffusion-controlled. Thus, increased temperatures do not significantly shorten the extraction time. For that reason extraction at room temperature is preferred to minimize costs.

Depending on the desired purity of the product, multiple extraction may become necessary. This is preferably accompanied by use of a fresh extraction solution.

The extraction vessel can be made of glass or porcelain enamel, as long as hydrofluoric acid is not present in the extraction solution. Metal vessels coated with fluorinated polymers, such as PFA or FEP or vessels made of polyethylene or polypropylene can also be used. In the latter case, it is advantageous to fluorinate the vessels on the surface.

After drying, the extracted melt pellets may be processed using normal melt processing equipment. The transport of the extracted pellets is preferably carried out in containers which protect the product from dust, moisture and pressure loading or compaction. An especially high standard of purity is provided by containers with several sealing locations, such as is suggested by DE-A-100 05 579.6, and which can be obtained from the firm of Sulo under the name "PTFE Container 60 liter".

Examples of the invention are explained in more detail in the following examples. Percentages pertain to weight unless information to the contrary is provided.

Determination Methods:

The melt-flow index (MFI) was determined in accordance with ASTM D 1238 (DIN 53735) at 372° C. with a charge of 5 kg.

The end groups, including —COOH, —COF and —CONH$_2$, were determined by means of FTIR spectroscopy (FTIR Nicolet Magna 560 spectrometer) at a film thickness of 100 μm, as indicated in EP B-226 668 and U.S. Pat. No. 3,085,083. The end groups mentioned in the following are the sum of the free and associated carboxyl groups, —CONH$_2$ and —COF per $10^6$ carbon atoms.

The metal content was determined through extraction of the samples using 2% nitric acid for 72 hours at room temperature (unless otherwise indicated), whereby the extract was subjected to atom-absorption spectroscopy. Iron, chrome, nickel and vanadium were found as metal impurities. The iron content was consistently an order of magnitude higher than for the other metals. The detection limit for iron was 10 ppb (10 ng/g). The acid used had an Fe content below the detection limit, i.e., <10 ppb.

The determination of the extractable F$^-$ content is carried out on the melt pellets. To do this, 20 g of the pellets are extracted with 30 g of deionized water for 24 hours at 80° C. The fluoride ion content in the obtained extract is determined using an ion-sensitive fluoride electrode (firm of Orion).

EXAMPLES

A PFA copolymer with an MFI of 2, melting point of 308° C., and polymerized by means of well-known emulsion polymerization, is finished by means of three different work-up methods. The first two steps of the work-up procedure, namely the gasoline agglomeration and the drying at 270° C., are the same in all three methods. The completion of the work-up procedures differ in the steps which take place following the agglomeration and drying.

Example 1

In Example 1, the work-up is completed by fluorinating the agglomerate in a stationary bed. To do this, 3 kg of hot agglomerate from the drying step above are added, via a ball valve, to a 100 cm long, stainless steel pipe with a diameter of 80 mm. The inside surface of the pipe was previously surface treated by contact with fluorine. The air is subsequently replaced by dry nitrogen. The reactor is then brought to a temperature of 150° C. Following that, the $N_2$ atmosphere is replaced by a 20 vol.-% $F_2/N_2$ mixture. The fluorine mixture is renewed every 0.5 hours. The fluorination is terminated after 3 hours. During fluorination, the product cools down to about 100° C. The unreacted fluorine gas is removed through 10 minutes of flushing with $N_2$. The fluorinated agglomerate obtained in this way still contains 13 unstable end groups per $10^6$ C atoms. The fluorinated agglomerate is then melt pelletized. The pellets are subjected to an acid extraction with 2% $HNO_3$ for 4 hours in a polyethylene container, washed four times with deionized water and then dried. The analytically determined iron and fluorine contents are listed in Table 1.

Comparison Example 1a

In Comparison Example 1a, a second portion of the above prepared dried agglomerate is melt pelletized before the fluorination step. One hundred kg of the melt pellets are dried, then are subjected to fluorination with a 20 vol.-% $F_2/N_2$ mixture in a 250-liter tumble dryer at 150° C. The tumble dryer is also made of rust-free stainless steel. The fluorine gas mixture is renewed hourly. The fluorination is terminated after 5 hours. The unreacted fluorine is removed by means of $N_2$ flushing. The PFA product obtained in this way still exhibits 9 end groups per $10^6$ C atoms. The analytically determined iron and fluorine contents are listed in Table 1.

Comparison Example 1b

In Comparison Example 1b, a third portion of the dried agglomerate is prepared and fluorinated in the same way as Comparison Example 1a, and is then subjected to an aqueous wash in addition. The wash water is set to a pH value of 7.5 using an aqueous ammonia solution. The wash is carried out for 4 hours at a temperature of 80° C. After leaving the wash solution, the pellets are dried with hot nitrogen.

TABLE 1

|  | Example 1 | Comparison Example 1a | Comparison Example 1b |
|---|---|---|---|
| Fl⁻ (ppm)* | <0.1 | 0.9 | 0.5 |
| Fe (ppb)** | <10 | 750 | 195 |

*Extraction in water at 80° C. for 24 hours
**Extraction in 2% $HNO_3$ solution for 72 hours at room temperature The PFA product in accordance with the invention from Example 1 has an iron content which is lower by as much as two orders of magnitude.

Example 2

In Example 2, a product was produced in a manner similar as that prepared for Example 1. The dried agglomerate (100 kg) was fluorinated in a 250 liter tumble dryer as described below. The rate of change in the number of end groups was measured during the fluorination process. The results during the agglomerate fluorination are shown in Table 2.

The fluorination reaction is also noted to be exothermic. The reaction heat developed during the reaction is demonstrated for each charge with fluorine gas mixture that is sent to the agglomerate for the fluorination. Each charge causes a minimal increase in the agglomerate temperature. The half-time of the reaction can be determined from this temperature increase. At 110° C. it is 20 minutes, and at 220° C. it is 10 minutes.

Comparison Example 2

In Comparison Example 2, the starting material was similar to Example 2 except the dried agglomerate was also melt pelletized before the fluorination process. In practice, the reaction heat during the fluorination of melt pellets is nearly impossible to demonstrate because hardly any temperature increase can be determined. The reaction is too slow, probably due to the fact that the diffusion rate of the fluorine gas through the denser pellet limits the reaction.

Table 2 shows the very different rate of conversion of end groups. One hundred kg each of agglomerate and pellet forms of the polymer were put into separate 250-liter tumble dryers. Air was replaced by dry nitrogen. The material was heated to 150° C. The nitrogen was then replaced by 10 vol.-% $F_2/N_2$. Pressure is 1 bar. Every hour, the fluorine gas mixture is renewed. Samples are taken before each recharge, and their end groups are determined through IR spectroscopy. Both PFA samples have practically only COOH end groups. The MFI of the melt pellets being used is 23.5, that of the agglomerate is 21.0. The MFI values are not changed by the fluorination.

TABLE 2

Elimination of the end groups

|  | Number of Recharges | | | | | | |
|---|---|---|---|---|---|---|---|
|  | 1 | 2 | 3 | 4 | 5 | 6 | 7 |
|  | Number of end groups per $10^6$ C atoms | | | | | | |
| Melt Pellet Comparison Example 2 | 532*) | 422 | 362 | 257 | 199 | 120 | 75 | 8 |
| Agglomerate Example 2 | 480*) | 297 | 143 | 45 | 10 | **) | — | — |

*)Starting material
**)Experiment cut short

The fluorination of the agglomerate form proceeds faster and thus reduces consumption of expensive fluorine.

Example 3

Iron contamination during fluorination in the stationary bed.

Fluorination in a stationary bed was carried out in a rust-free stainless steel pipe with a diameter of 80 mm and a length of 100 cm. The pipe was brought into contact with fluorine for the purpose of surface treatment. The surface-treated pipe was filled with 480 g of PFA agglomerate. Air was replaced by dry nitrogen, and the pipe heated overnight to 150° C. The fluorination was carried out with 6 charges, each 0.5 hours, 20 vol.-% $F_2/N_2$, without any kind of additional heating. The iron content in the starting PFA agglomerate was below 10 ppb. After fluorination, the iron content was 13 ppb.

Comparison Example 3

In a 250-liter stainless steel tumble dryer, 100 kg of PFA agglomerate was fluorinated at 150° C. with a 10 vol.-% $N_2/F_2$ mixture at 2 revolutions per minute for 6 hours. Separate 100 kg quantities were fluorinated with a 20 vol.-% $N_2/F_2$ mixture for 3 hours. In each case, the $F_2$ gas mixture was renewed every 30 minutes.

The fluorination is exhaustive. Using IR spectroscopy, it was no longer possible to find any end groups in the fluorinated product. The iron content is measured as described above.

Table 3 shows the iron contamination of the agglomerate before and after fluorination in the tumble dryer.

TABLE 3

| Number | Iron content in ppb before fluorination | Iron content in ppb after fluorination | Fluorination time [h] |
|---|---|---|---|
| 1 | 25 | 635 | 6 |
| 2 | 33 | 983 | 6 |
| 3 | <10 | 544 | 6 |
| 4 | <10 | 121 | 3 |
| 5 | 27 | 357 | 3 |

Example 4

In Example 4, multiple experiments were run to demonstrate the effects of changes in the pH value, the acid selected, the temperature and the extraction time.

For each experiment, 150 g of PFA melt pellets with an MFI value of 2.1 and 150 g of deionized water were added, along with various amounts of added acid as listed in Table 4a, into PFA flasks that had been carefully washed with $HNO_3$. The extraction was carried out with no stirring at temperatures in accordance with Table 4a. The iron content of the aqueous solution was measured in accordance with the contact times shown in Table 4a.

Table 4a lists the obtained iron contents of the extraction acids for the various extraction times.

TABLE 4a

| Experiment | Acid Added | Concentration | pH | Temp. ° C. | 1 hour | 7 hours | 72 hours | 168 hours |
|---|---|---|---|---|---|---|---|---|
| 1 | HNO$_3$ | 2.0 | 0.6 | RT | 930 | 1000 | 980 | 970 |
| 2 | HNO$_3$ | 2.0 | 0.6 | 80 | 990 | 1090 | 1070 | 1030 |
| 3 | HNO$_3$ | 0.1 | 1.9 | RT | 920 | 930 | 940 | 950 |
| 4 | HNO$_3$ | 0.1 | 1.9 | 80 | 1020 | 1040 | 1040 | 1080 |
| 5 | HNO$_3$ | 0.05 | 2.6 | RT | 920 | 930 | *)— | — |
| 6 | HNO$_3$ | 0.05 | 2.6 | 80 | 1000 | 1020 | *)— | — |
| 7 | HCOOH | 2.0 | 2.0 | RT | 980 | 1030 | 1030 | *)— |
| 8 | HCOOH | 2.0 | 2.0 | 60 | 980 | 1040 | 1030 | *)— |
| 9 | HCOOH | 0.5 | 2.4 | RT | 990 | 1000 | *)— | — |
| 10 | HCOOH | 0.5 | 2.4 | 60 | 930 | 970 | *)— | — |
| 11 | HF | 0.5 | 3.5 | RT | 910 | 900 | *)— | — |
| 12 | HF | 0.5 | 3.5 | 60 | 930 | 920 | *)— | — |
| 13 | HF | 0.1 | 4.1 | RT | 900 | 900 | *)— | — |
| 14 | HF | 0.1 | 4.1 | 60 | 920 | 910 | *)— | — |

*)Experiment cut short

The effect of increased extraction temperatures is slight. The extraction can be carried out very effectively at room temperature and in a surprisingly short time (1 hour).

As is shown in Table 4a, the extraction appears to be quantitative after only a few hours.

Table 4b lists the observed iron contents from the PFA melt pellets of Experiments 5, 9 and 13 of Table 4a. After the contact time of 7 hours as shown in Table 4a, the pellets are carefully washed with deionized water before a second extraction. The second extraction is with a fresh extraction solution.

TABLE 4b

| Experiment in Table 4a | Iron content of the extraction solution in ng/g after 7 hours with 2 wt.-% HNO$_3$ | 68 hours | Analytically determined iron in the product [ppb]* |
|---|---|---|---|
| 5 | <10 | <10 | <10 |
| 9 | <10 | 15 | 24 |
| 13 | 15 | 27 | 44 |

*This test is run on washed pellets from Table 4a, (2 wt % HNO$_3$ for 72 hrs.)

Example 5

Similar extraction results are achieved with FEP melt pellets. The results are shown in Table 5a.

Fluorinated FEP melt pellets with an MFI value of 23.3 and 35 end groups per $10^6$ C atoms are used to generate the following Iron content data.

TABLE 5a

| Experiment | Acid Added | Concentration | Iron content of the extraction solution in ng/g after 1 hour | 7 hours |
|---|---|---|---|---|
| 1 | HNO$_3$ | 0.1 | 1100 | 1130 |
| 2 | HNO$_3$ | 0.05 | 1100 | 1150 |

After the exposure to the acid solution described in Table 5a, the pellets were washed with deionized water and then tested for iron content using 2 wt % HNO$_3$ for 72 hours. The results were 22 and 33 ppb for Experiments 1 and 2 respectively.

Comparison Example 5

Melt pellets made in a manner similar to that described in Example 4 are extracted with solutions with a pH value >6. The results are shown in Table 5b. The higher pH values are achieved through the addition of NH$_3$.

TABLE 5b

| Extraction solution | PH | Temperature ° C. | Iron content of the extraction solution in ng/g after 3 hours | 7 hours | 24 hours |
|---|---|---|---|---|---|
| Deionized water | 6.8 | RT | 340 | 280 | 230 |
| Deionized water | 6.8 | 60 | 430 | 280 | 290 |
| Deionized water | 6.8 | 80 | 100 | 100 | 120 |

TABLE 5b-continued

| Extraction solution | PH | Temperature °C. | Iron content of the extraction solution in ng/g after | | |
|---|---|---|---|---|---|
| | | | 3 hours | 7 hours | 24 hours |
| Deionized water + NH$_3$ | 7.9 | RT | 330 | 290 | 290 |
| Deionized water + NH$_3$ | 8.3 | 80 | 280 | 150 | 120 |

The iron content decreases with longer contact time and higher extraction temperatures. It is assumed that iron salts hydrolyze and convert into insoluble deposits.

Similar results are obtained with a repeated extraction.

What is claimed is:

1. A fluoropolymer comprising a melt-processable perfluorinated fluorothermoplastic, in the form of melt-pellets, having less than 0.05 ppm extractable metal ions.

2. A fluoropolymer comprising a melt-processable perfluorinated fluorothermoplastic, in the form of melt-pellets, having less than 0.5 ppm extractable fluoride ions and less than 0.02 ppm heavy metals.

3. A fluoro polymer according to claim 1 wherein the fluorothermoplastic has less than 30 unstable end groups per $10^6$ carbon atoms.

4. A fluoro polymer according to claim 3 wherein the fluorothermoplastic has less than 0.02 ppm extractable ions.

5. A fluoro polymer according to claim 1 wherein the extractable ions comprise ions selected from the group consisting of iron, chrome, nickel and vanadium.

6. A fluoro polymer according to claim 3 wherein the unstable end groups comprise end groups selected from the list consisting of —COOH, —COF and —CONH$_2$.

7. Articles for use in the semi-conductor industry comprising a fluoropolymer according to claim 1.

* * * * *

UNITED STATES PATENT AND TRADEMARK OFFICE
CERTIFICATE OF CORRECTION

PATENT NO. : 7,148,301 B2
APPLICATION NO. : 10/743208
DATED : December 12, 2006
INVENTOR(S) : Thomas J. Blong It is certified that error appears in the above-identified patent and that said Letters Patent is hereby corrected as shown below:

Col. 12, Line 5 delete "fluoro polymer" and insert -- fluoropolymer --, therefor.

Col. 12, Line 8 delete "fluoro polymer" and insert -- fluoropolymer --, therefor.

Col. 12, Line 10 delete "fluoro polymer" and insert -- fluoropolymer --, therefor.

Col. 12, Line 13 delete "fluoro polymer" and insert -- fluoropolymer --, therefor.

Signed and Sealed this

Sixth Day of March, 2007

JON W. DUDAS
*Director of the United States Patent and Trademark Office*